(12) United States Patent
Bro

(10) Patent No.: US 6,321,524 B1
(45) Date of Patent: Nov. 27, 2001

(54) SYSTEM FOR THE ROUTING OF BUNDLES OF WIRES

(75) Inventor: Karsten Bro, Viby J (DK)

(73) Assignee: Hans Thyge Raunkjaer, Abyhøj (DK)

(*) Notice: Subject to any disclaimer, the term of this patent is extended or adjusted under 35 U.S.C. 154(b) by 0 days.

(21) Appl. No.: 09/423,610

(22) PCT Filed: May 15, 1998

(86) PCT No.: PCT/DK98/00189

§ 371 Date: Nov. 15, 1999

§ 102(e) Date: Nov. 15, 1999

(87) PCT Pub. No.: WO98/52265

PCT Pub. Date: Nov. 19, 1998

(30) Foreign Application Priority Data

May 15, 1997 (DK) .............................................. 199700561

(51) Int. Cl.[7] ........................................................ F16L 3/14
(52) U.S. Cl. ................................................ 59/78.1; 248/49
(58) Field of Search ................................. 59/78.1; 248/49, 248/51

(56) References Cited

U.S. PATENT DOCUMENTS

| | | |
|---|---|---|
| 3,779,003 | 12/1973 | Boissevain et al. . |
| 4,582,281 | 4/1986 | Van Camp . |
| 4,840,023 * | 6/1989 | Borsani .................. 59/78.1 |
| 5,824,957 * | 10/1998 | Holshausen .............. 59/78.1 |
| 5,900,586 * | 5/1999 | Carr ...................... 59/78.1 |

FOREIGN PATENT DOCUMENTS

| | | |
|---|---|---|
| 196 17 900 | 12/1996 | (DE) . |
| 0 260 740 | 3/1988 | (EP) . |
| 0 412 233 | 2/1991 | (EP) . |
| 2 233 163 | 1/1991 | (GB) . |

* cited by examiner

*Primary Examiner*—David Jones

(57) ABSTRACT

For the collective routing of bundles of wires, it is known to use partly open tubes composed of mutually outwardly-flexible, partly cylindrical elements which are slotted to enable the insertion of wires herein. Known configuration have certain disadvantages which are overcome by the invention, in that use is made of alternating modular elements of two completely different types, i.e. stiff wire-holding elements (2) with a core part (6) having radially-extending wing parts and shield-plate parts (8, 10), and intermediate distance elements (4) in the form of flexible rod parts for releasable assembly with the ends of said core parts (6). There is hereby achieved a tubular structure which is flexible in all directions in a non-jangling manner and which can freely be lengthened or shortened.

7 Claims, 1 Drawing Sheet

SYSTEM FOR THE ROUTING OF BUNDLES OF WIRES

The present invention concerns a system for the routing of bundles of wires, comprising a number of partly-cylindrical elements which are slotted to enable wires to be inserted therein, said elements being held together with a certain mutual distance between the ends of the partly-cylindrical surfaces, and in such a manner that a string of elements thus held together is more or less flexible. With such a string, it is possible to route wires in collected bundles and to insert new wires herein at any place along the string and from any sideways direction, and wires from the string can similarly be branched-out at desired places in any transverse direction.

Various configurations of such systems are known, e.g. in the form of slotted tube pieces which at the free ends have axially-projecting flanges by means of which the tube pieces are hinged together in a pivotable manner. This provides a loose-jointed and jangling structure which merely has the advantage that the string of tube pieces can be adjusted in length in accordance with requirements. With another known configuration, use is made of a through-going support string surrounded by retaining bushes, which on projecting wing parts support partly-cylindrical shield-plates, and which are mutually held together on the support string by means of axially-projecting coupling arms with pivot connection to intermediate coupling rings on the string. This configuration is less loose-jointed but, on the other hand, since the system is not easy to extend as desired, one is dependent on given lengths of string.

With the present invention, a third solution is disclosed which combines and even improves the advantages of the two known systems, and without adopting their disadvantages. According to the invention, use is made of two kinds of modular elements, i.e. wire-holding elements which are preferably made of semi-hard plastic and are built up with a central core part with radially-extending wing parts which support partly-surrounding shield plates, and distance elements which are intended to be assembled with the ends of said core parts for mutual axial separation and securing of these, and herewith together with these to form a central core in the system, and which are preferably made of soft plastic with the object of making the system as a whole flexible.

There can hereby be built up a more or less long holding system in accordance with requirements, and which is totally free of "loose-jointedness", in that it will appear as a homogeneous string which is suitably flexible and has projecting shield parts for the implementation of the routing function.

Figure 1:
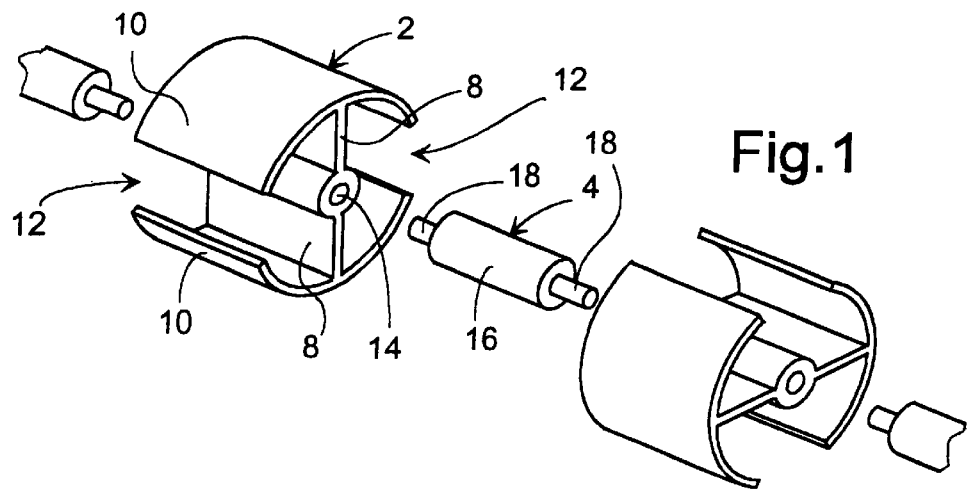
Figure 2:
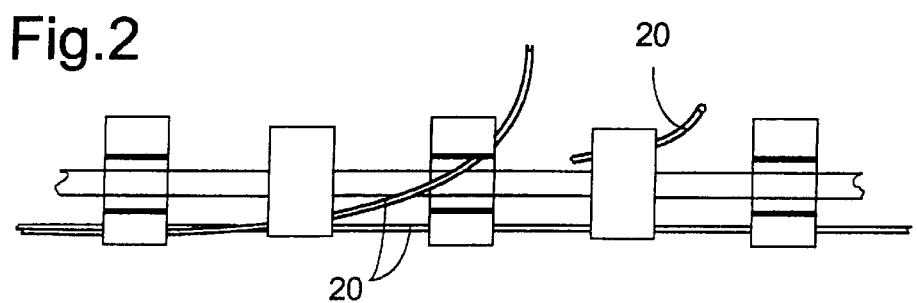
Figures 3, 4, 5:
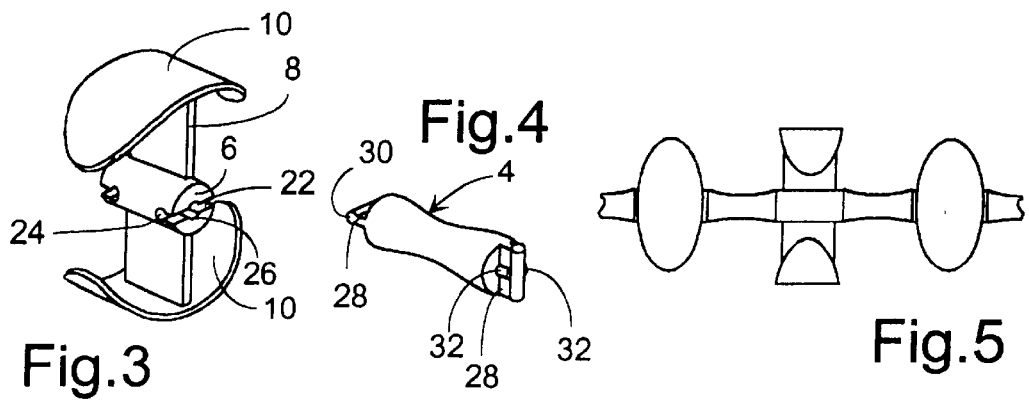
Figures 6, 7:
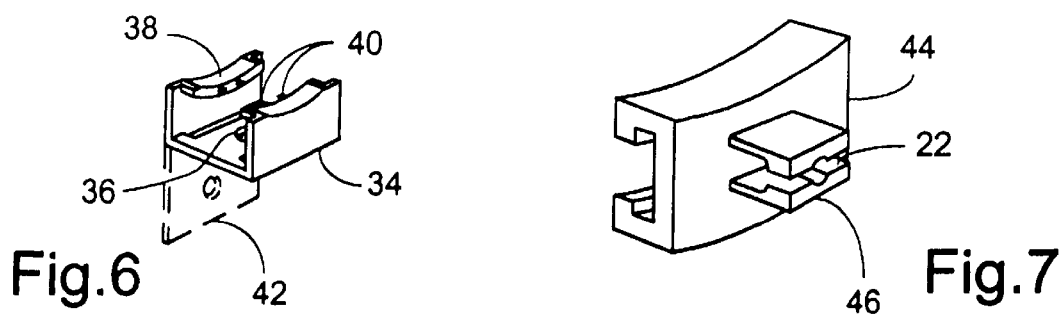

The invention will now be described in more detail with reference to the drawing, in that FIG. 1 is an exploded perspective view of a holding system according to the invention, FIG. 2 is a side view of the assembled system, FIG. 3 and FIG. 4 are perspective views of respective system parts in a preferred embodiment thereof, FIG. 5 is a side or plan view of same in assembled state, and FIG. 6 is a perspective view of a mounting holder for an element in accordance with claim 3, and FIG. 7 is a perspective view of a coupling block for establishing an angular transition, In FIG. 1 is shown a series of two different types of elements, i.e. wire holders 2 and distance pieces 4. The elements 2 are configured with a cylindrical core part 6 which has radially-extending wing parts 8 which at their outer ends support respective partly-cylindrical shells 10 in the formation of a short tube piece which is split or has axial slots 12 on opposite sides. The ends of the core pieces 6 are provided with central holes 14.

It will hereby be possible to effect the alternate coupling together of the elements 2 and 4 as shown in more detail in FIG. 2, in that it is also hereby possible to turn the elements 2 in such a way that their outer slots 12 lie staggered in relation to one another seen in the circumferential direction.

As shown in FIG. 2, wires 20 can be inserted through the slots 12 in the assembled string structure, and when extending lengthwise the wires will be held in the form of a bundle by the elements 2. Also as indicated in FIG. 2, the branching-in or branching-out of wires can be arranged at any place along the string. However, it should be mentioned that this form of holding effect on the bundle of wires is not new in itself.

The holding connections between the dowels 18 and the holes 14 can naturally be configured in such a way that a snap-lock effect is established when they are assembled, and which will make the assembled string suitably resistant against separation by an axial force, e.g. a gravitational force when the string is mounted in a hanging manner. The person responsible for assembling the string can himself determine how much the successively-following elements 2 shall be turned in relation to one another, in that they do not necessarily need to be turned 90° to one another as shown in FIGS. 1 and 2.

However, such a turning of precisely this 90° will be a preferred possibility, and this has been employed with the preferred embodiments of the elements 2 and 4 shown in FIGS. 3–5. It will appear immediately from FIG. 3 that the shield plates 10 are configured with a tapering rounded shape which, however, is primarily for reasons of design, and that the ends of the core piece 6 are not only configured with round central holes, but also with transversely radial slots 22 which end in an inner transverse enlargement 24. However, the contour 26 of a central hole is formed in the central part of the slots 22.

In FIG. 4 it is shown that the ends of the distance pieces 4 are correspondingly configured with flat, projecting ribs 28, the outermost ends of which have thickened parts 30. These parts 28, 30 will thus be suitable for assembly with the core parts 6 by sideways insertion herein, whereby a decidedly traction-stiff connection can be established. Said rib parts 28 can have central enlargements 32 which, by the sideways pressing together of the elements and by cooperation with the enlargements 26 in the core parts 6, will result in these being snap-locked in a central position.

As shown in FIG. 4, the rib parts 28 at the opposite ends of the parts 4 are arranged orthogonally, whereby in the assembly of the string structure it will be obvious that the elements 2 are coupled together while successively turned at 90° to one another.

It could be a possibility for each of the elements 2 to be configured with an integral distance piece 4, but the use of separate distance pieces provides the advantage that the elements can be injection moulded in a more or less hard material, while the elements 4 can be moulded in a soft and elastic material, whereby the assembled string can become suitably flexible with the character of a firm, pliant rod without link connections.

In FIG. 6 there is shown a mounting holder 34 which has a securing hole 36 for fastening to a support surface, while the holder in general is provided with arcuate rail parts 38 which at their undersides are suitable for receiving one of the curved shield plates 10 on an element 2 by the engaging of the shield plate in the holder 34. The inner edges of the rails 38 are provided with a pair of projections 40 which, by co-operation with the end edges of the associated wing plates 8, can give rise to a snap-lock effect. The shown holder is suitable for the fastening of an element 2 in a position projecting from a support surface, but a corresponding holder can be configured with a securing plate part 42 which enables an element 2 to be fastened in a position in which it lies up against the support surface.

Furthermore, the system can be provided with various special components in the form of bends, T-pieces, support feet, suspension pieces etc. In FIG. 7 there is shown a coupling piece 44 in the form of a block which, in principle, corresponds to the mounting holder shown in FIG. 6, but which is merely further provided with a socket head 46 with a recess 22 (like that in FIG. 3), so that this block can be coupled in as an angular transition or T-transition between a coupling element 4 and a wire holder 2, whereby holding strings can lead out from the block in the main directions indicated by the stippled lines.

What is claimed is:

1. A system for routing bundles of wires comprising:

a number of partly-cylindrical elements formed of a central core part from which wing parts radially extend, cylindrical sector shaped segments, each of which is mounted on an end of a respective wing part with adjacent cylindrical sector shaped segments being separated in a circumferential direction by a slot for enabling insertion of wires within the elements; and a plurality of elongated spacer elements, each of opposite ends of each elongated spacer element being fixedly connected to one of a respective pair of said partly-cylindrical elements for the formation of a string of partly-cylindrical elements, facing edges of which are spaced apart from each other;

wherein said partly-cylindrical elements are form of a relatively hard material, and wherein each of said elongated spacer element is formed of a soft and elastic material for enabling flexing of said string of partly-cylindrical elements.

2. A system for routing bundles of wires according to claim 1, wherein the connection between the partly-cylindrical elements and the elongated spacer elements is a pin and hole snap-lock connection between ends of the core parts and ends of the spacer elements.

3. A system for routing bundles of wires according to claim 1, wherein the connection between the partly-cylindrical elements and the elongated spacer elements is a rib and slot snap-lock connection between ends of the core parts and ends of the spacer elements.

4. A system for routing bundles of wires according to claim 1, wherein ends of the cylindrical sector shaped segments bordering the slots have a rounded tapering contour.

5. A system for routing bundles of wires according to claim 1, further comprising a mounting holder for fastening of the string of partly-cylindrical elements to a supporting structure.

6. A system for routing bundles of wires according to claim 5, wherein said mounting holder has an engagement part which shaped to couple with a cylindrical sector shaped segment.

7. A system for routing bundles of wires according to claim 5, wherein said mounting holder has an engagement part which shaped to couple with an end of a spacer element.

\* \* \* \* \*